G. A. KÄSTNER.
Pad for Horse's Feet.
No. 202,947. Patented April 30, 1878.
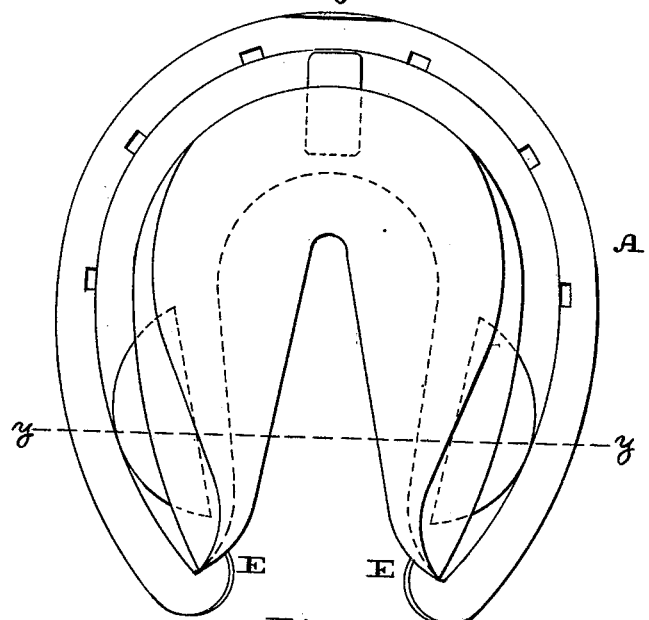
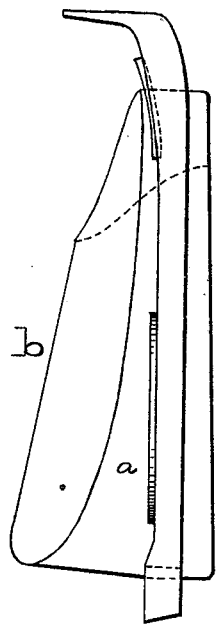
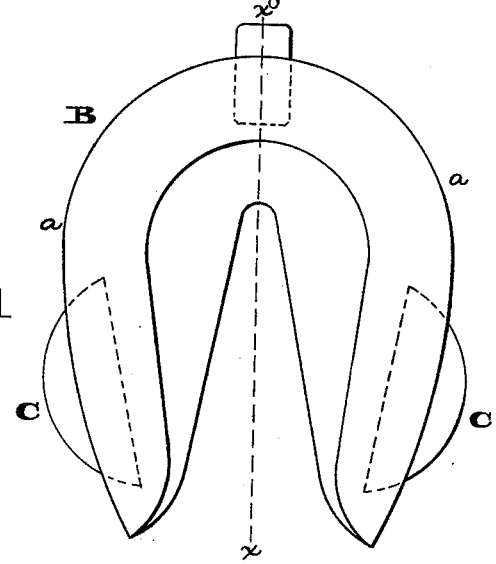
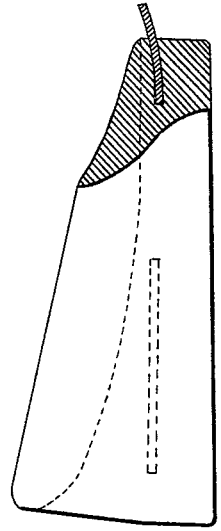
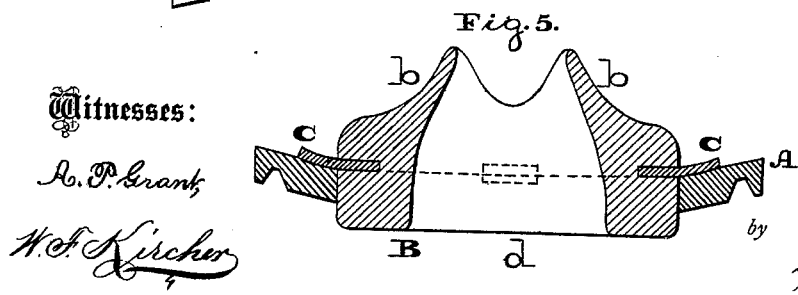
Witnesses:
A. P. Grant
W. F. Kircher
Inventor:
G. A. Kästner
by John A. Wiedersheim
ATTORNEY.

UNITED STATES PATENT OFFICE.

GUSTAV ADOLPH KÄSTNER, OF PLAGWITZ, LEIPZIG, GERMANY.

IMPROVEMENT IN PADS FOR HORSES' FEET.

Specification forming part of Letters Patent No. 202,947, dated April 30, 1878; application filed March 6, 1878.

*To all whom it may concern:*

Be it known that I, GUSTAV A. KÄSTNER, of Plagwitz, Leipzig, Germany, have invented a new and useful Improvement in Pads for Horses' Feet, which improvement is fully set forth in the following specification and accompanying drawings, in which—

Figure 1 is a view of the upper face of a horse's shoe with attached foundation. Fig. 2 is a bottom view of the foundation. Fig. 3 is a side elevation of Fig. 1. Fig. 4 is a longitudinal section in line $x\,x$, Fig. 2. Fig. 5 is a transverse section in line $y\,y$, Fig. 1.

Similar letters of reference indicate corresponding parts in the several figures.

My invention consists of pads or elastic foundations for easing the blows or strain on the hoofs of animals, the same being easily applied and removed, and possessing other advantages, as will be hereinafter set forth. For this purpose I construct the foundations of bifurcated blocks of soft rubber having upwardly-projecting frog portions, downwardly-extending treads, and embedded attaching-clips.

Referring to the drawings, A represents a horseshoe, and B represents a bifurcated pad of soft rubber, whose sides $a$ are of the contour of the inner side of the shoe, upwardly-projecting face $b$ that of the frog of the hoof, and bottom $d$ flat and projecting below the lower face of the shoe, so as to form a cushioned tread.

Projecting from the front and sides of the pad B are clips C C, which are adapted to rest on the upper face of the shoe, between the same and the hoof, for holding the pad in position, said clips being secured to the pad by being embedded therein during the process of manufacture.

When the pad or foundation B is to be applied to the shoe, which is nailed to the hoof, the rear ends of said pad are brought together, the front clip being fitted over the upper face of the shoe, which is slightly beveled to admit the clips. Then force up the rear of the foundation to full extent, and allow the rear ends to expand, whereby the side clips will rest on the upper face of the shoe, thus properly attaching the foundation to the shoe.

It will be seen that I provide an easy or elastic bearing for the hoof, which will relieve the hoof of the injurious effects of blows or thrusts of the hoof during the movements of the animal. The foundations also prevent glass, nails, &c., reaching and injuring the hoofs. The natural growth of the hoofs is not interfered with by the foundation, owing to the elasticity of the latter. The humidity of the hoof necessary for the growth of the latter is not absorbed by the rubber foundation. Owing to the clips, nails or screws are not required to fasten the foundation, and implements are not required to apply and remove the foundation.

The removal of the foundation is readily accomplished by bringing together the rear ends of the foundation or pad B, then drawing down said ends, whereby the foundation may be released from the shoe.

In order to prevent displacement of the foundation in the longitudinal direction of the hoof, the rear of the shoe is formed with inwardly-projecting lips E, which form shoulders, against which the rear ends of the foundation have an abutment, as readily seen in Fig. 1, the advantages whereof are evident.

Having thus described my invention, what I claim as new, and desire to secure by Letters Patent, is—

The pad B, of soft rubber, bifurcated, and having the upwardly-projecting frog portion $b$ and downwardly-extending tread $d$, in combination with the embedded clips C C, all constructed, arranged, and operating as herein set forth, and for the purpose specified.

The above specification signed by me.

GUST. AD. KÄSTNER.

In presence of—
  PAUL MEYER,
    *Plagwitz, Leipzig.*
  LEOPOLD SCHULZ,
    *Plagwitz, Leipzig.*